Patented May 1, 1923.

1,454,002

UNITED STATES PATENT OFFICE.

CLAUDIUS VERNIAUD, DECEASED, LATE OF QUINCY, ILLINOIS, BY CLOTILDE J. VERNIAUD, ADMINISTRATRIX, OF QUINCY, ILLINOIS, ASSIGNOR, BY MESNE ASSIGNMENTS, TO G. M. C. METALLIC GREASE CO., OF QUINCY, ILLINOIS, A CORPORATION OF DELAWARE.

LUBRICATOR.

No Drawing.   Application filed June 29, 1922. Serial No. 571,797.

*To all whom it may concern:*

Be it known that CLAUDIUS VERNIAUD, deceased, late a citizen of the United States, and resident of Quincy, in the county of Adams and State of Illinois, invented new and useful Improvements in Lubricants, and that CLOTILDE J. VERNIAUD, the duly constituted administratrix of the estate of CLAUDIUS VERNIAUD, deceased, does hereby declare the following to be a full, clear, and exact description of the said invention of said decedent, CLAUDIUS VERNIAUD, and such as will enable others skilled in the art to which it appertains to make and use the same.

This invention relates generally to lubricants, and particularly to an improved scientifically compounded grease for lubricating transmissions, differentials, ball bearings, roller bearings, journals, etc.

The improved grease is a metallic antifriction composition containing metal which forms a film between the working parts of machinery. It is not affected by heat or cold or climatic conditions and therefore it will not run or gum. Furthermore, it is of a high fire test.

The improved grease is composed essentially of cup grease, lead dust, babbitt dust and white lead, although lamp black may be also used for coloring purposes.

It has been found that the best results are obtained by mixing the ingredients in the proportions of fifty pounds of cup grease (preferably #4), to one pound of lead dust, to one-fourth of a pound of babbitt dust, to one ounce of powdered white lead, and if lamp black is used, it is added until the desired color is obtained.

The fifty pounds of cup grease will be formed of the following ingredients: 2 8/21 pounds of animal fat, 1 pound of caustic soda solution at 40 Baumé, 2 pounds of milk of lime (chemically pure hydrated lime and paraffine oil—1 pound of lime and 1/7 gallon of paraffine oil), and 7 1/7 gallons of paraffine oil, 28%—100 at 100.

In making the improved grease the #4 cup grease should be placed in a mechanical mixer and melted until liquid by a treatment with steam. It should then be allowed to cool until it is of about the consistency of #3 cup grease. Then, while the mixer is operating, the lead dust and babbitt dust should be gradually added, followed by the addition of the white lead and finally the lamp black. After the ingredients have been thoroughly mixed together, the resulting products should be run into a grinding mill and thoroughly ground in order to break up any lumps that it may have and to make it smooth.

The grease of course can be made according to a different process if desired, and since good results can be obtained by combining the ingredients in other proportions besides those hereinbefore specified and by using equivalents for the hereinbefore specified ingredients, it is to be understood that certain changes of this nature may be made within the meaning and scope of the appended claims.

I claim:

1. A lubricant composed of cup grease, lead dust, babbitt dust, and white lead.

2. A lubricant composed principally of cup grease and having mixed with the cup grease lead dust, babbitt dust, and white lead, the proportion of cup grease to the ingredients mixed therein being greater than 25 to 1.

3. A lubricant composed of cup grease, lead dust, babbitt dust, and powdered white lead, combined in substantially the proportions of 50 pounds of cup grease, to 1 pound of lead dust, to one-fourth pound of babbitt dust, to one ounce of powdered white lead.

In testimony whereof, I, CLOTILDE J. VERNIAUD, administratrix of the estate of CLAUDIUS VERNIAUD, have hereunto set my hand.

CLOTILDE J. VERNIAUD,
*Administratrix of Claudius Verniaud, deceased.*